United States Patent [19]
Ohshima

[11] Patent Number: 5,343,469
[45] Date of Patent: Aug. 30, 1994

[54] COMMUNICATION SYSTEM AND COMMUNICATION DEVICES HAVING LOCK FUNCTION

[75] Inventor: Izumi Ohshima, Tokyo, Japan

[73] Assignee: NEC Corporation, Tokyo, Japan

[21] Appl. No.: 713,963

[22] Filed: Jun. 11, 1991

[30] Foreign Application Priority Data
Jun. 14, 1990 [JP] Japan ................................. 2-155884
Nov. 14, 1990 [JP] Japan ................................. 2-307694

[51] Int. Cl.⁵ .......................... H04L 12/40; H04J 3/24
[52] U.S. Cl. .................... 370/85.1; 370/94.1; 370/110.1
[58] Field of Search ............... 370/94.1, 60.0, 61, 370/94.2, 85.1, 85.2, 85.3, 85.4, 110.1, 92, 93, 24; 340/825.5, 825.51; 375/107

[56] References Cited

U.S. PATENT DOCUMENTS

| | | | |
|---|---|---|---|
| 4,707,828 | 11/1987 | Yamuda | 370/94.1 |
| 4,788,637 | 11/1988 | Tamaru | 370/94.1 |
| 4,914,654 | 4/1990 | Matsuda et al. | 370/94.1 |
| 4,937,816 | 6/1990 | van Steenbrugge et al. | 370/94.1 |
| 4,951,281 | 8/1990 | Muto et al. | 370/85.8 |
| 4,998,245 | 3/1991 | Tanaka et al. | 370/94.1 |
| 5,031,175 | 7/1991 | Tanaka et al. | 370/94.1 |

FOREIGN PATENT DOCUMENTS
0333269 3/1989 European Pat. Off. .

Primary Examiner—Wellington Chin
Assistant Examiner—Ajit Patel
Attorney, Agent, or Firm—Whitham, Curtis, Whitham & McGinn

[57] ABSTRACT

A communication system includes at least one slave communication device to be a communication partner to a master communication device for performing data transfer therebetween using communication packets. Each of the communication packets includes control bits which are information relating to locking for the slave communication device and data length bits indicative of the size of a message to be transferred. In transmitting the communication packet from the master communication device to the slave communication device. The slave communication device is locked when locking is designated by the control bits and is unlocked when a message having a data length specified by the data length bits has been transferred successfully. Thus. The slave communication device can be locked or unlocked by the master communication device using the same control bits in accordance with information as to whether or not a predetermined message has been transferred successfully. Thus, the processing in the master communication device can made simple and the transfer efficiency of a message can be improved.

5 Claims, 9 Drawing Sheets

COMMUNICATION SYSTEM AND COMMUNICATION DEVICES HAVING LOCK FUNCTION

BACKGROUND OF THE INVENTION

The present invention relates to a communication system for transmitting a message or data using a communication packet and, more particularly, to a communication device having a lock function of responding to only the communication packet sent from a specific communication device and a communication system using it.

As a communication system including such a communication, a domestic digital bus (D2B) which is a data bus between household audio/video devices has been proposed. Also, an example of the patent which relates to such communication system is a European Patent Application No. EP 0333269.

Figure 1:
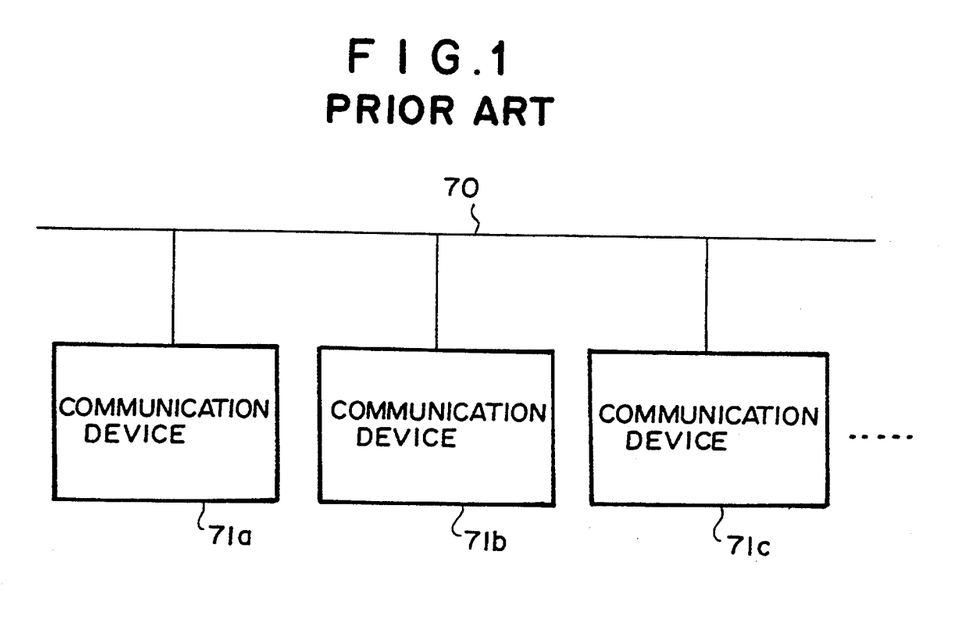
FIG. 1 is a view showing the arrangement of the prior art D2B communication system.

An arrangement of the D2B communication system including a plurality of communication devices is shown in FIG. 1. Specifically, in FIG. 1, the communication system is composed of a transmission or transfer path 70 and a plurality of communication devices 71a, 71b, 71c ... connected with the transmission path 70. In tile D2B communication system, each of the communication devices 71a, 71b, 71c ... has a function serving as a master device capable of independently executing a communication (that is, "a multi-master function"). The communication device as a master will send out a communication packet described below to the transmission path 70. Another device which has been designated as a communication partner by the communication packet will serve as a slave receiving this communication packet.

Figure 2:
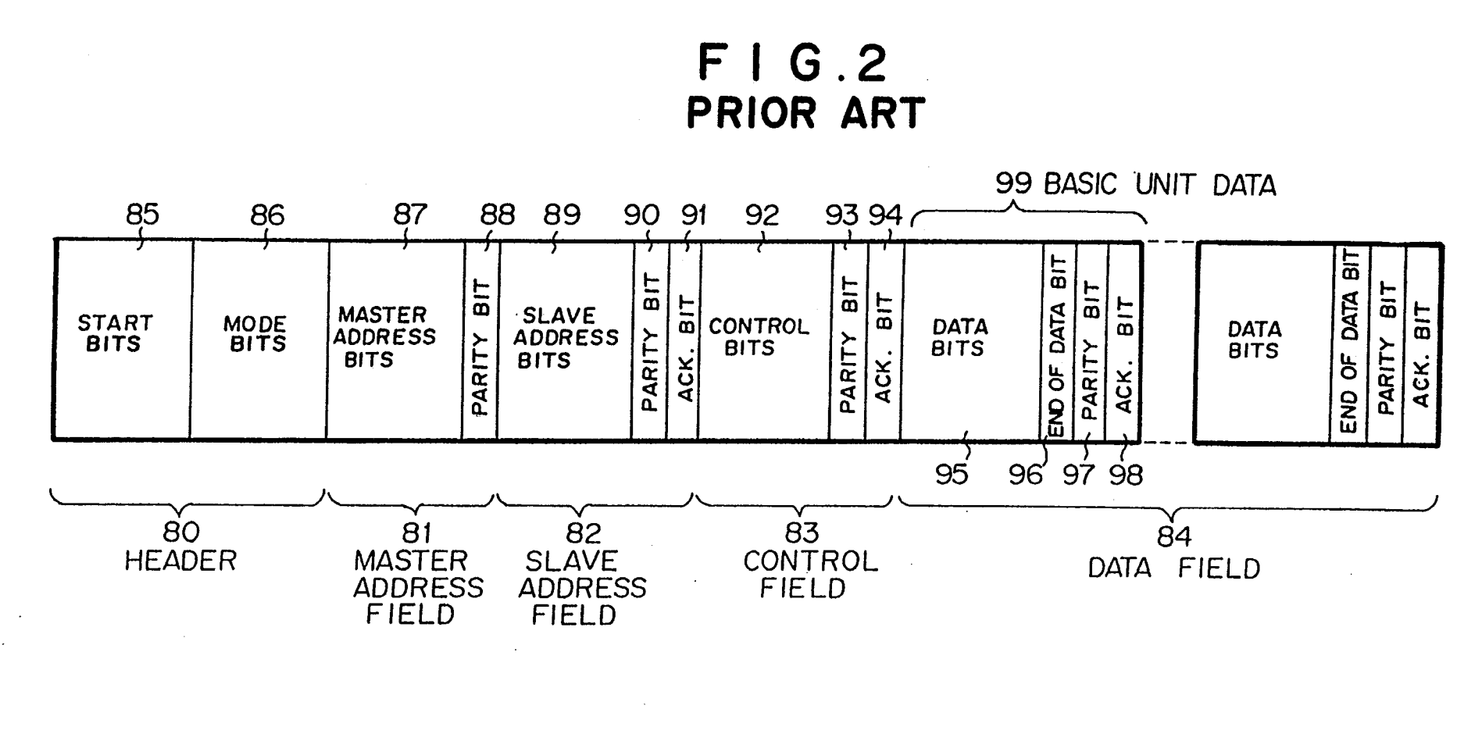
FIG. 2 is a view showing the format of the communication packet used in the D2B communication system.

The format of the communication packet used in the D2B communication system is shown in FIG. 2. As shown in FIG. 2, the communication packet is composed of a header 80, a master address field 81, a slave address field 82, a control field 83 and a data field 84.

The header 80 is composed of start bits 85 indicative of sending a communication packet and mode bits 86 indicative of either one of three kinds of modes (modes 0, 1 and 2) with different transfer speeds. The master address field 81 is composed of master address bits 87 indicative of the address of the communication device serving as a master and a parity bit 88. The slave address field 82 is composed of slave address bits 89 indicative of the address of a slave communication device which is a communication partner of the master communication device, a parity bit 90 and an acknowledge bit 91 for acknowledging right reception of the communication packet by the slave communication device. The control field 83 is composed of control bits 92 described below, a parity bit 93, and an acknowledge bit 94. In this case, the control bits 92 are a control code indicative of the transfer direction and contents of communication data, and lock setting or lock releasing. For example, the control bits of requesting data write in a slave communication device and setting lock is referred to as "Bh", that of requesting data write and releasing lock is referred to as "Fh", and that of requesting reading the status from the slave communication device is referred to as "6h".

The data field 84 is composed of repetition of basic unit data 99 which includes 1 (one) byte data bits 95, an end-of-data bit 96 indicative of an end of the communication data, a parity bit 97 and an acknowledge bit 98. A message will be transferred acknowledging that it has been received by a receiving communication device for each one byte data based on the basic unit data 99. If the one byte data have not been received and hence the acknowledge bit has not been sent back, the same one byte data will be transferred again. The maximum number of times of repetition of the basic data unit 99 is determined in accordance with the communication mode (mode 0, 1, or 2) defined by the mode bits 86. For example, it is 32 in the case of mode 1. Therefore, in the case of mode 1, the data up to 32 bytes can be transferred using one communication packet.

An explanation will be given of the method for transferring a message from a master communication device to a slave communication device. In the D2B communication system, the message over a plurality of communication packets will be transferred to the slave communication device in a manner of locking the slave communication device. Locking the slave communication device will be performed using the control bits 92 of requesting locking in the case where the communication packet the acknowledge bit of which has been sent back owing to successful transfer of at least one byte data within the data field 84 has been exchanged between the master communication device and the slave communication device concerned. Thereafter, until the locking is released, the locked slave communication device will not receive or accept a communication packet sent from any communication device other than the master communication device having locked the slave communication device concerned. On the other hand, releasing the locking (hereinafter referred to as "unlocking") of the slave communication device will be performed using the control bits 92 of requesting unlocking in the case where the communication packet the acknowledge bit of which has been sent back owing to successful transfer of at least one byte data within the data field 84 has been exchanged between the master communication device and the slave communication device concerned.

Figure 3:
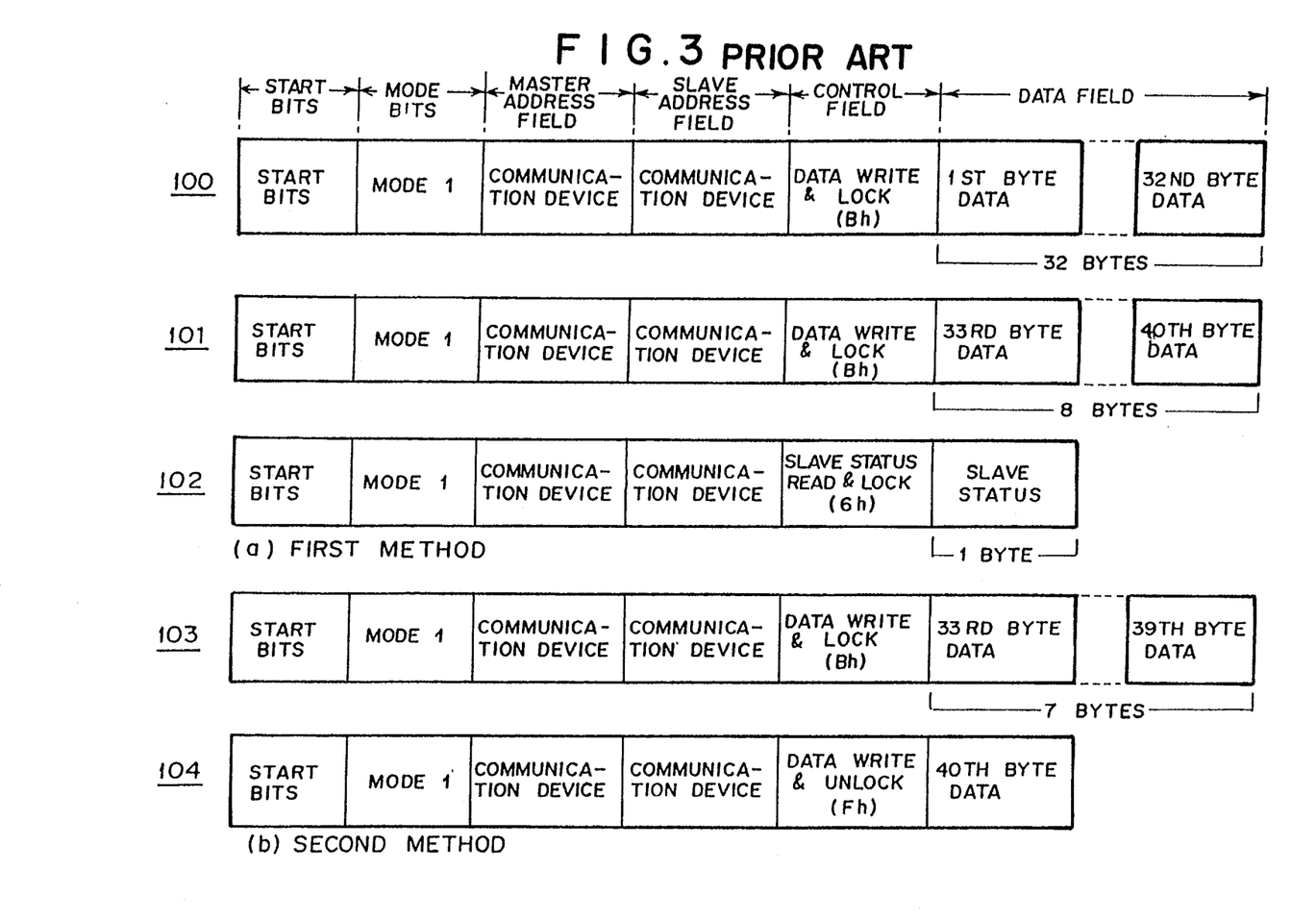
FIG. 3 is a view showing combinations of communication packets in the D2B communication system.

FIG. 3 shows a combination of communication packets in transferring a message of 40 bytes in communication mode 1 from the communication device 71a as a master in FIG. 1 to the communication device 71b as a slave. It should be noted that in the communication as shown in FIG. 3, three communication packets are transferred from the communication device 71a to the communication device 71b.

The first transferring method will be explained.

In the first communication packet 100, the control bits 92 are set for "Bh" (data write and locking) to request locking and transfer 32 byte data which can be transferred in mode 1. Now, it is assumed that the 32 byte data have been transferred satisfactorily. Since this means that the data of one byte or more have been transferred satisfactorily, the slave communication device 71b will be locked by the master communication device 71a.

In the second communication packet 101 also, the control bits 92 are set for "Bh" (data write and locking) to request locking and transfer the remaining 8 byte data to be added to the 32 byte data which have already been transferred using the first communication packet 100. In this case, since the communication device 71b has already been locked, it remains locked regardless of the communication result, i.e., whether the remaining 8 byte data have been completely transferred or even one byte data has not been transferred. Now it should be noted that the second communication packet 101 does not set the control bits 92 for "Fh" (data write and unlocking) which is a code requesting release of locking. This is because it is not guaranteed that the second communication packet can surely transfer the remaining 8 byte data. Although not shown in FIG. 1, for example, if the communication device 71b has a buffer area for data reception of only one byte and is late to read out the received data from the buffer, the second communication packet 101 may be able to transfer only one byte corresponding to the size of the buffer. In this case, although 7 bytes to be transferred remain, the communication device 71b will be unlocked.

In the third communication packet 102, the control bits 92 are set for "6h" (read of slave status and unlocking) to read one byte slave status from the slave communication device 71b. When the slave status has been successfully read out, the communication device 71b will be unlocked.

Another transfer method will be explained below. As the first communication packet has the same format as in the above first transfer method, the same explanation is not repeated here. In the second communication packet 103, the control bits 92 are set for "Bh" to request locking and transfer 7 byte data which is lesser by one byte than the remainder (8 bytes) of the message to be added to the 32 byte data transferred using the first communication packet 100. In the last third communication packet 104, the control bits 92 are set for "Fh" (data write and unlocking) to request unlocking and transfer the remaining one byte data. When this last one byte data has been successfully transferred, tile communication device 71b will be unlocked.

In this way, by locking the communication device serving as a slave, the communication device serving as a master can transfer data to the slave communication device without being disturbed by other communication devices. Further, since the slave communication device does not accept or receive the communication packet from any communication device other than a specific communication device, communication data over a number of communication packets can be formed as one message.

However, the communication system has the following disadvantage. In order to surely transfer data from a master communication device to a slave communication device, one communication packet is required for the purpose of locking/unlocking so that one redundant communication packet must be transferred. For example, in order to transfer 40 byte data which can be transferred using two communication packets in the mode 1, at least three communication packets are required. This makes the transfer efficiency inferior. Further, since the values of the control bits set for locking and unlocking are different, the master communication device must construct the communication packets by taking into account the locking of the slave communication device, thus making the processing required complicate.

SUMMARY OF THE INVENTION

It is, therefore, an object of the invention to overcome the problems existing in the conventional communication system and to provide an improved communication system and device.

It is another object of the invention to provide a communication system which can easily lock a slave communication device to transfer data efficiently and simplify the operation for locking by a master communication device.

It is further object of the invention to provide a slave communication device having a lock function of responding to only the communication packet sent from a specific communication device in the above communication system.

According to one aspect of the present invention, there is provided a communication system comprising a transmission path, at least one master communication device capable of executing a communication, and at least one slave communication device to be a communication partner to the master communication device for performing data transfer therebetween using communication packets, wherein each of the communication packets includes control bits which are information relating to locking of the slave communication device and data length bits indicative of the size of a message to be transferred, and wherein in transmitting the communication packets from the master communication device to the slave communication device, the slave communication device is locked when locking is designated by the control bits and is unlocked when a message having a data length specified by the data length bits has been transferred successfully.

BRIEF DESCRIPTION OF THE DRAWINGS

The above and other objects, features and advantages of the present invention will be apparent from the following description of preferred embodiments of the invention explained with reference to tile accompanying drawings, in which.

DESCRIPTION OF THE PREFERRED EMBODIMENTS

Now, with reference to the accompanying drawings, the present invention will be explained in connection with several embodiments thereof.

It should be noted that the communication system to which the present invention is to be applied is entirely the same as that of the prior art D2B communication system as shown in FIG. 1.

Figure 4:
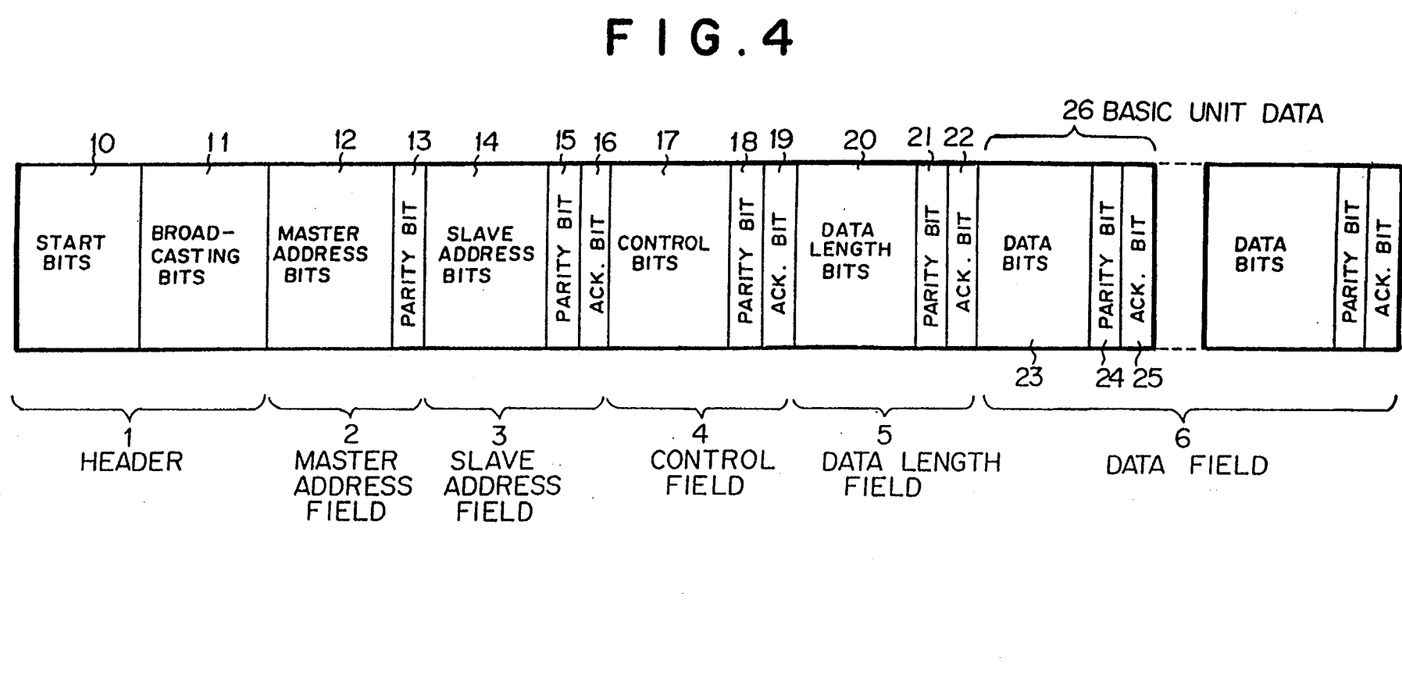
FIG. 4 is a view showing the format of the communication packet used in tile communication system according to the invention.

FIG. 4 shows the format of the communication packet for data transfer used in the communication system according to the present invention. In FIG. 4, the communication packet is composed of a header 1, a master address field 2, a slave address field 3, a control field 4, a data length field 5 and a data field 6.

The header 1 is composed of start bits 10 indicative of transmission of a communication packet and broadcasting bits 11 for selecting individual communication or broadcasting communication.

The master address field 2 is composed of master address bits 12 and a parity bit 13, the master address bits 12 being indicative of the address of a master communication device mainly executing a communication.

The slave address field 3 is composed of slave address bits 14 indicative of the address of a slave communication device which is a communication partner of the master communication device, a parity bit 15 and an acknowledge bit 16 for acknowledging right reception of the communication packet by tile slave communication device.

The control field 4 is composed of control bits 17 indicative of control information for data to be transferred, a parity bit 18, and an acknowledge bit 19. TABLE shows the contents of the control bits 17.

TABLE 1

| CONTROL BIT | | | | |
|---|---|---|---|---|
| BIT 3 | BIT 2 | BIT 1 | BIT 0 | FUNCTION |
| 0 | 0 | 0 | 0 | READ OF SLAVE STATUS |
| 0 | 0 | 0 | 1 | Undefined |
| 0 | 0 | 1 | 0 | Undefined |
| 0 | 0 | 1 | 1 | DATA READ & LOCKING |
| 0 | 1 | 0 | 0 | READ OF LOCKING ADDRESS (LOWER ORDER 8 BITS) |
| 0 | 1 | 0 | 1 | READ OF LOCKING ADDRESS (HIGHER ORDER 4 BITS) |
| 0 | 1 | 1 | 0 | READ OF SLAVE STATUS & UNLOCKING |
| 0 | 1 | 1 | 1 | DATA READ |
| 1 | 0 | 0 | 0 | Undefined |
| 1 | 0 | 0 | 1 | Undefined |
| 1 | 0 | 1 | 0 | COMMAND READ & LOCKING |
| 1 | 0 | 1 | 1 | DATA WRITE & LOCKING |
| 1 | 1 | 0 | 0 | Undefined |
| 1 | 1 | 0 | 1 | Undefined |
| 1 | 1 | 1 | 0 | COMMAND WRITE |
| 1 | 1 | 1 | 1 | DATA WRITE |

In TABLE 1, the control bits 17 are a 4-bit code consisting of the direction of transferring a message, the contents of the message and the information relating to locking. The transfer direction of a message is defined by tile most significant bit MSB (i.e., bit 3) of the control bits 17. If the MSB is "1", the message will be transferred from a master communication device to a slave communication device ("WRITE"). If the MSB is "0", the message will be transferred from the slave communication device to the master communication device ("READ"). The contents of the message include reading of slave status, data and a lock address, and writing of a command and data. The code relating to locking the slave communication device includes "3h", "Ah" and "Bh" The acknowledge bit 17 is sent back from the slave communication device only when the control bits 17 transferred from the master communication device can be rightly processed. For example, in the case where the MSB (bit 3) of the control bits 17 is "1", the slave communication device will not send back the acknowledge bit 17 unless its buffer for data reception is vacant.

The data length field 5 is composed of the data length bits 20 indicative of the size of a message, a parity bit 21 and an acknowledge bit 22.

Lastly, the data field is composed of repetition of basic unit data 26 which includes l(one) byte data bits 23 indicative of a message, a parity bit 24 and an acknowledge bit 25. The message will be transferred acknowledging that It has been received by a receiving communication device for each one byte data based on the basic unit data 26. If the one byte data have not been received and hence the acknowledge bit has not been sent back, the same one byte data will be transferred again. The maximum number of times of repetition of the basic data unit 26 is 32 so that the data will be transferred within this number of times. Therefore, the data up to 32 bytes can be transferred using one communication packet.

Figure 5:
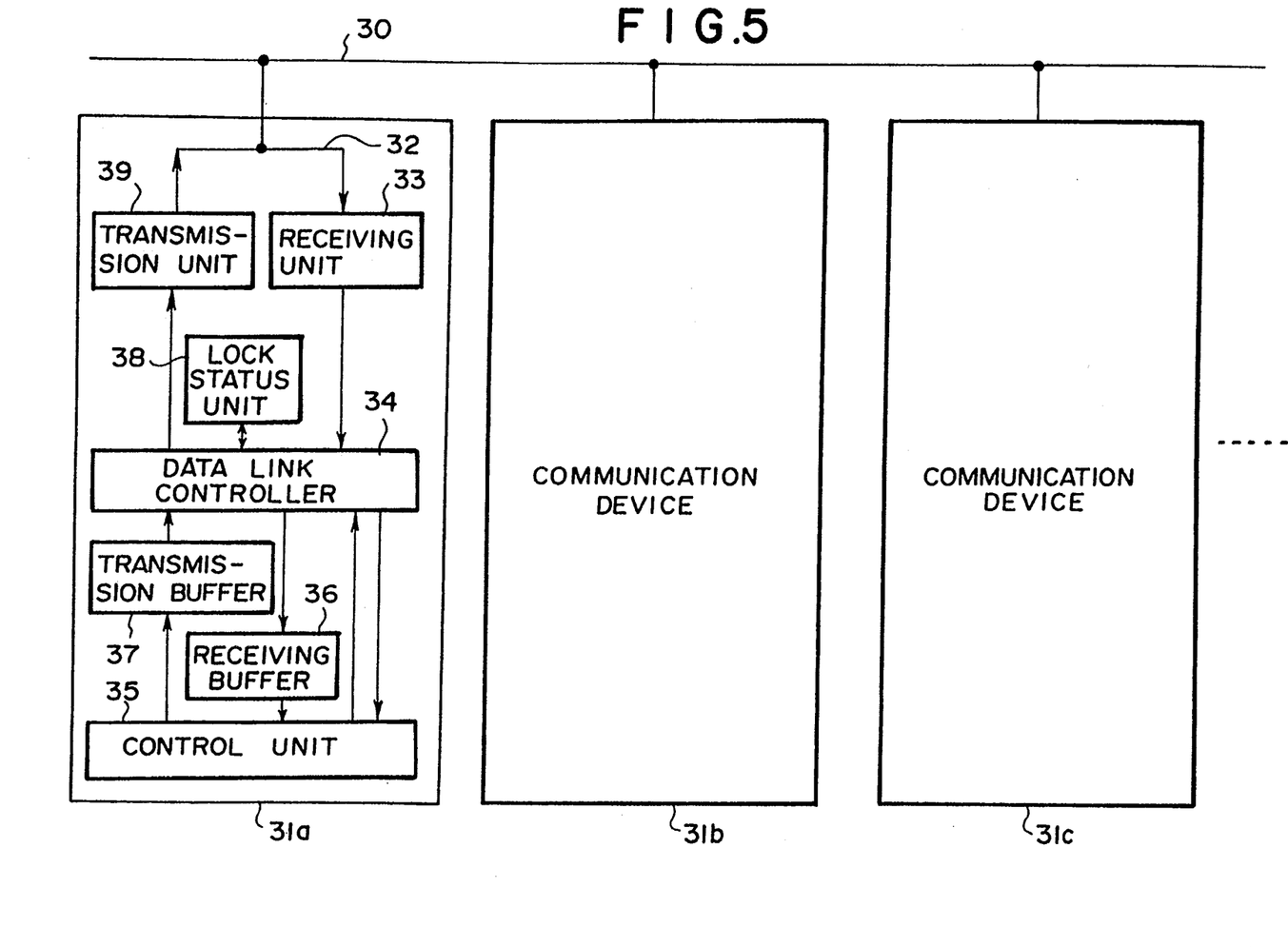
FIG. 5 is a block diagram showing the arrangement of the communication system according to the invention.

FIG. 5 is a block diagram of an arrangement of the communication system according to the present invention. As shown in FIG. 5, the communication system is composed of a transmission path 30 and a plurality of communication devices 31a, 31b, 31c . . . .

The communication device 31a is composed of an input and output (I/O) terminal 32 for the transmission path 30, a receiving unit 33, a data link controller 34, a control unit 35, a receiving buffer 36, a transmission buffer 37, a lock status unit 38 and a transmission unit 39. The I/O terminal 32 is connected with the input of the receiving unit 33 and the output of the transmission unit 39. The output of the receiving unit 33 is connected with the input of the data link controller 34. The first output terminal of the data link controller 34 is connected with the control unit 35 and the second output terminal thereof is connected with the input of the receiving buffer 36. The input/output terminal of tile data link controller 34 is connected with the input/output terminal of the lock status unit 38. The first output terminal of the control unit 35 is connected with the input of the data link controller 34 and its second output is connected with the input of the transmission buffer 37. The output of the receiving buffer 36 is connected with the input of the control unit 35. The output of the transmission buffer 37 is connected with the input of tile data link controller 34. The output of the data link controller 34 is connected with the input of the transmission unit 39. Each of the other communication devices 31b, 31c . . . has the same arrangement as that of the communication device 31a.

Next, referring to FIGS. 6A and 6B, a detailed explanation will be given of the method for transferring a message from a master communication device to a slave communication device. It should be noted that the communication system according to the present invention can lock the slave communication device for the purpose of surely transferring a message from the master communication device to the slave communication device. Specifically, locking of the slave device is executed, using the control bits 17 ("3h", "Ah" and "Bh") relating to locking of the slave communication device in a communication packet when the data length bits 20 are successfully transferred so that the acknowledge bit is sent back. On the other hand, unlocking of the slave device is executed, using the same control bits when the message having the number of bytes designated by the data length bits 20 has been successfully transferred.

Figure 6A:
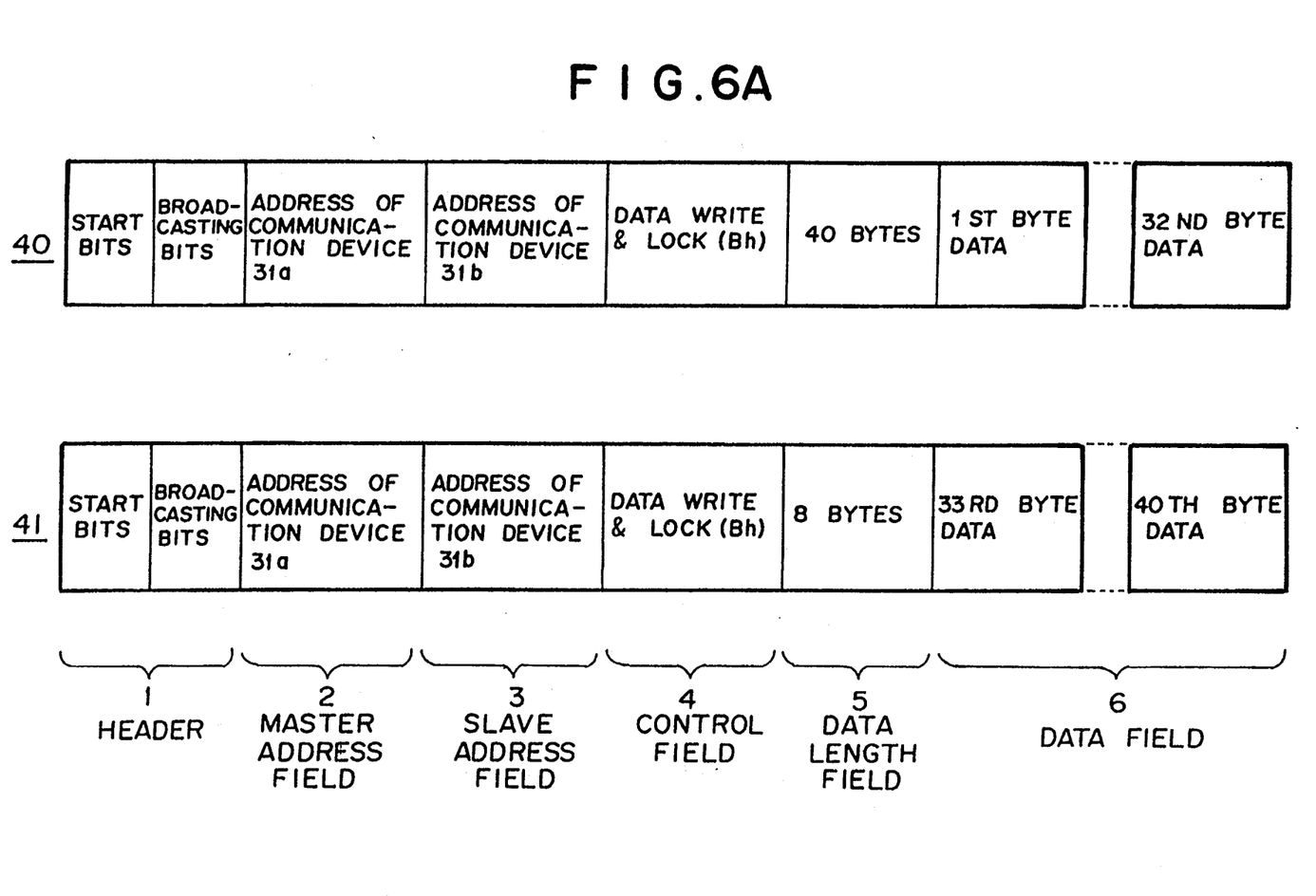
FIG. 6A is a view showing a combination of communication packets used in the communication system according to the invention.
Figure 6B:
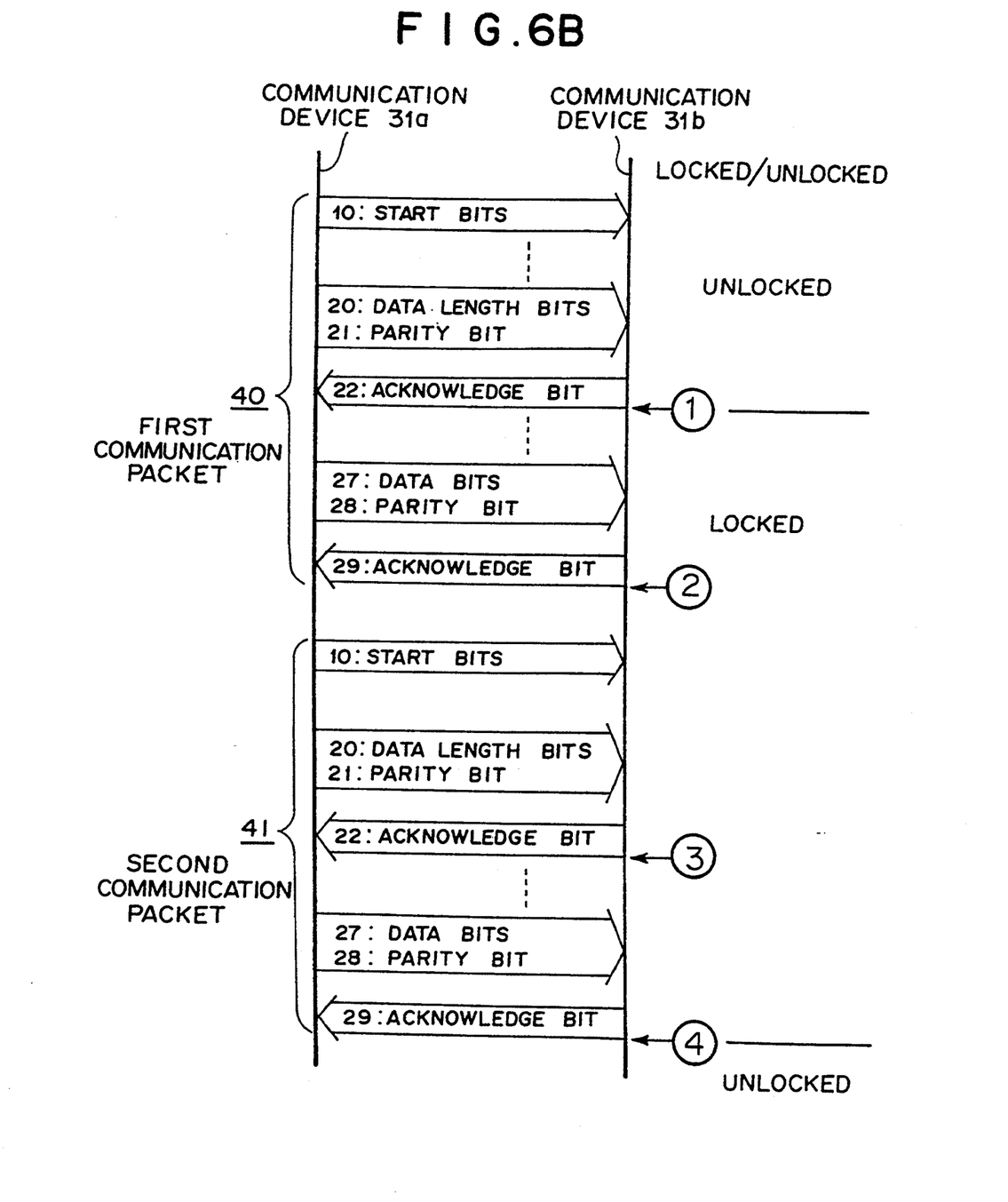
FIG. 6B is a view showing the sequence of the first embodiment of the communication system according to the invention.

FIG. 6A shows a combination of communication packets in the case where a 40 byte message is transferred from the communication device 31a as a master to the communication device 31b specified as a slave (FIG. 5). FIG. 6B shows a communication sequence between the communication device 31a and the communication device 31b.

In FIG. 6A, the number of communication packets to be transferred in the present invention is 2 whereas it is 3 in the prior art. In the first communication packet 40, with the control bits 17 set for "Bh" (data write and lock) and the data length bits 20 set for 40 bytes, the data is transferred. Then, when the slave communication device 31b receives the data length bits 20 successfully and sends back the acknowledge bit 22, it is locked by the master communication device 31a (FIG. 6B ①).

Further, one communication packet permits tile data up to only 32 bytes to be transferred, so that the first communication packet 40 cannot complete reception of the 40 byte data specified by the data length bits 20 (although it completes reception of 32 byte data in this embodiment). Therefore, at the end of transferring the first communication packet 40 (FIG. 6B ②), the communication device 31b does not satisfy the condition for unlocking so it remains locked by the master communication device 31a. As a result, the communication device 31b will not receive a communication packet from any communication device other than from the communication device 31a.

Next, the master communication device 31a transfers the second communication packet 41 to the slave communication device 31b. In the second communication packet 41, with the control bits set for "Bh" which is the same in the first communication packet 40, and the data length bits 20 set for 8 bytes which corresponds to the remaining message, the remaining data will be transferred. Then, when the slave communication device 31b sends back the acknowledge bit 22 in the data length field 5 of the second communication packet 41 (FIG. 6B ③) it will be locked by the master communication device 31a again. Thereafter, when the 8 byte data specified by the data length bits 20 are transferred successfully (FIG. 6B ④), the communication device 31b is unlocked by the communication device 31a and restored to its original state.

In this way, in the communication system according to the present invention, unlocking of the slave communication device is automatically executed in accordance with the communication result, so that it is not necessary for the communication device serving as a master to attend to the unlocking and so its processing can be made easily. The message can be transferred with less number of communication packets so that its transfer efficiency can be improved.

Further, with reference to FIG. 5, the method of transferring a message will be explained mainly in terms of the operation in the master communication device 31a.

The control unit 35 of the master communication device 31a sets, through its second output, the data corresponding to the respective fields constituting the first communication packet 40 in the transmission buffer 37. Specifically, with the slave address bit 14 set for the address of the slave communication device 31b, the control bits 17 set For "Bh" (data write and locking) and the data length bits 20 set for 40 bytes, the message is set in the transmission buffer 37. Thereafter, the control unit 35 emits, through its first output, a command of requiring data transmission to the data link controller 34. Then, the data link controller 34 reads out the data From the transmission buffer 37 so as to constitute a communication packet. The data will be transferred to the transmission unit 39. The transmission unit 39 modulates the input data and sends out the modulated data to the transmission path 30 as the first communication packet 40 through the I/O terminal 32. In this case, the maximum length of a message which can be transferred within one communication frame (packet) is 32 bytes so that the message of 40 bytes specified by the data length bits 20 will not be transferred.

Then, in the communication device 31b serving as a slave, its receiving unit 33 receives the data on the transfer path 30 through the I/O terminal 32 and demodulates it. The receiving unit 33 supplies the demodulated data to the data link controller 34. The data link controller 34 decomposes tile data for each field and checks whether or not the data includes an error such as parity. The data link controller 34 supplies the received data to the receiving buffer 36 through its second output. Also, the data link controller 34 supplies a signal indicative of reception of the communication packet to the control unit 35 through its first output. In response to this signal, the control unit 35 reads the received data from the receiving buffer 36 so that the first communication packet 40 can be received.

Figure 7:
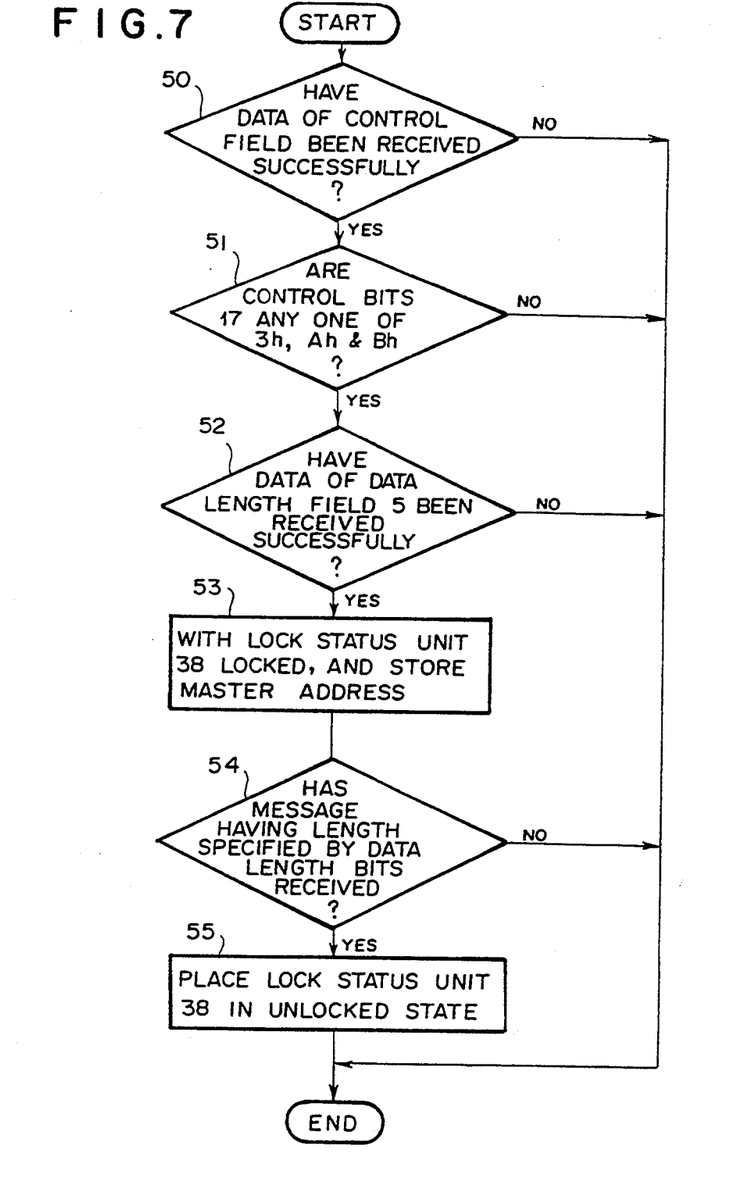
FIG. 7 is a flowchart showing the processing flow in the data link controller in the first embodiment of the communication device according to the invention.

Further, the data link controller 34 in the slave communication device 31b performs the processing relative to locking of the slave communication device 31b by the master communication device 31a. FIG. 7 is a flowchart of the processing flow relating to locking in the data controller 34.

In FIG. 7, first, whether or not the control field 4 has been received successfully is decided (routine 50). If it is "NO", the processing will be ended. If "YES", whether or not the control bits 17 are any one of "3h", "Ah" and "Bh" which are codes relative to locking will be decided (routine 51). If it is "NO", the processing will be ended. If "YES", that is, the control bits 17 are the code relative to locking, whether or not the data length field 5 has been received successfully will be decided (routine 52). If it is "NO", the processing will be ended. If it is "YES", the code indicative of being locked and the address of the master communication device 31a will be stored in the lock status unit 28 (routine 53). Next, whether or not message having a length specified by the data length bits 20 has been received is decided (routine 54). If it is "NO", the processing will be ended. If "YES", the code indicative of being not locked will be stored in the lock status unit 38 (routine 55), thus completing the entire processing.

Meanwhile, prior to starting data reception, the data link controller 34 reads the contents of the lock status unit 38. If the code indicative of being locked has been stored therein, the data link controller 34 will perform the data reception only when the address stored in the lock status unit 38 coincides with the master address 12 of a communication packet transferred.

The first communication packet 40 permits the message of only 32 bytes to be received although the length of 40 bytes is specified by the data length bits 20. Therefore, the data link controller 34 completes the processing after having executed tile routines 50, 51, 52, 53 and 54. Thus, the code indicative of being locked and the address of the communication device 31a are stored in the lock status unit 38. As a result, tile communication device 31b is locked and thereafter will receive only tile communication packet transferred from the communication device 31a until it is unlocked.

Next, the communication device 31a transmits the second communication packet 41 in the same manner as for the first communication packet 40. In this case, the control unit 35 in the communication device 31a sets in advance the control bits 17 for "Bh" which is also set for the first communication packet 40 and the data length bits 20 for 8 bytes which correspond to the size of tile remaining message.

The communication device 31b receives the second communication packet 41 transmitted from the first communication device 31a. Then, the second communication packet 41 permits the data link controller 34 in the second communication device 31b to receive the message having a length specified by the data length bits 20, so that the data link controller 34 will execute the routines 50, 51, 52, 53, 54 and 55. Thus, the code indicative of being unlocked will be stored in the lock status unit 38 to unlock the second communication device 31b.

As understood from the above description, the slave communication device can be locked and unlocked using the same control bits in accordance with the communication result so that tile master communication device is not required to previously attend to locking and unlocking, whereby the operation of tile communication device can be made simple. Further, the message can be transferred with the number of communication packets lesser by one than in the prior art, so that the transfer efficiency can be improved.

Now, referring to FIG. 8, an explanation will be given of the communication system and communication devices constituting it according to the second embodiment of the present invention. It should be noted that the arrangement of a communication system and the format of a communication packet are entirely the same as in the first embodiment previously described. When the communication device 31b specified as a slave by the communication device 31a receives the first communication packet 40 from the communication device 31a, it is locked. Then, when a predetermined communication has been completed, the master communication device 31a must unlock the slave communication device 31b. However, if in connection with the second communication packet 41, the control unit 35 in the communication device 31b is late to read out the data stored in the receiving buffer 36 so that the receiving buffer 36 does not become vacant readily, the second communication packet 41 cannot be received and thus the communication device 31b remains locked disadvantageously.

In order to obviate this difficulty, the control bits 17 include the code of "6h" (read of slave status and unlocking: see TABLE 1) which are control bits dedicated to unlocking in addition to the control bits (codes: "3h", "Ah" and "Bh") relating to locking.

Figure 8:
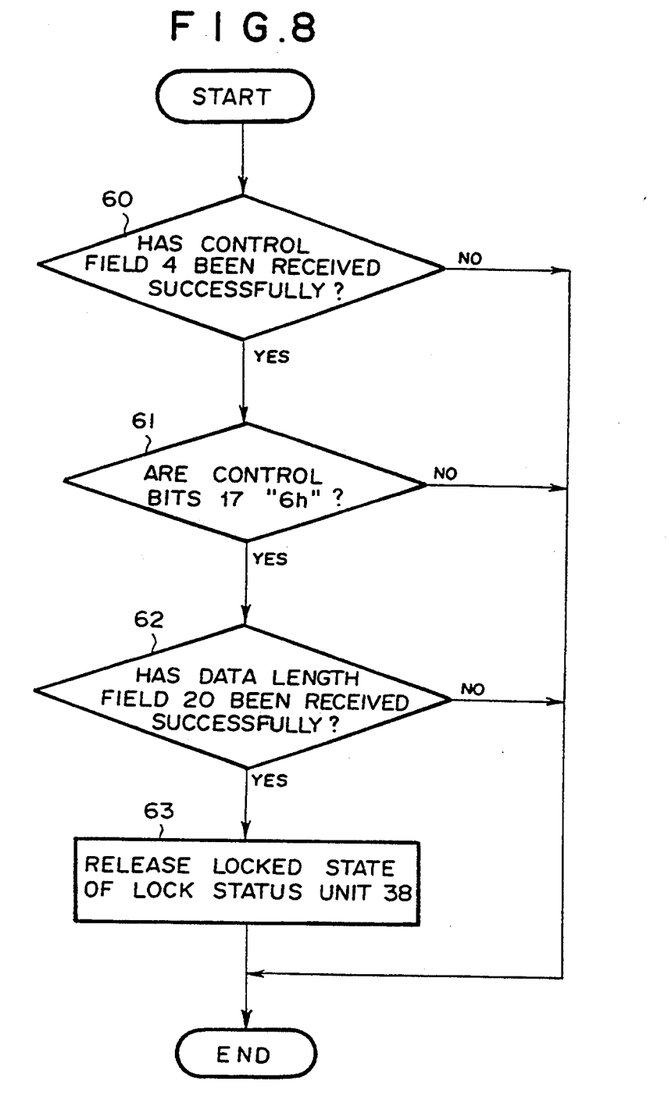
FIG. 8 is a flowchart showing the processing flow in the data link controller in the second embodiment of the communication device according to the invention.

FIG. 8 is a flowchart of the processing of the data link controller 34 for the control bits "6h" dedicated to unlocking. As seen from FIG. 8, if the control field 4 has been received successfully and then the control bits 17 are "6h" dedicated to unlocking (routines 60 and 61) and further the subsequent data length field 5 has been received successfully (routine 62), the data controller 34 in the slave communication device 31b will store the code indicative of not being locked in the lock status unit 38 to unlock the slave communication device 31b. Thus, the slave status will be transferred irrespectively of the condition of the receiving buffer 36 so that the communication device 31b can be unlocked unconditionally.

In accordance with the present invention, the slave communication device can be locked and unlocked using the same control bits in accordance with the communication result so that the control unit in the master communication device is not required to previously take into account locking and unlocking, whereby the operation of the communication device can be made simple. Further, the message can be transferred without using one communication packet dedicated to locking and unlocking, i.e., with the number of communication packets lesser by one than in the prior art so that the transfer efficiency of a message can be improved.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In a communication system comprising a transmission path, at least one master communication device capable of executing a communication, and at least one slave communication device to be a communication partner to said master communication device for performing data transfer therebetween using communication packets which include at least control bits indicative of at least locking, data length bits indicative of the size of a message to be transferred, and the message, wherein the improvement comprises:

first means in said slave communication device which is temporarily locked by said master communication device when said slave communication device receives said control bits indicative of locking, and second means in said slave communication device for unlocking said first means when said slave communication device successfully receives a message having a data length specified by said data length bits after said control bits indicative of locking have been received by said slave communication device.

2. A communication system according to claim 1, wherein said control bits include information indicative of unlocking, and said slave communication device is unlocked by said master communication device when said slave communication device receives said control bits indicative of unlocking.

3. A slave communication device for communicating, through a transmission path from a master communication device, communication packets composed of control bits indicative of at least locking, data length bits indicative of the length of the message, and the message, said slave communication device comprising:

a receiving unit for demodulating a signal on said transmission path to convert it into logic data, a data link controller for analyzing the logic data sent from said receiving unit, and a lock status unit for storing information relating to at least one of locking and unlocking sent from said data link controller, wherein, when said receiving unit receives said control bits indicative of locking from said master communication device, said data link controller temporarily writes information related to locking in the lock status unit so that said slave communication device is locked by said master communication device, and when said slave communication device successfully receives a message having a data length specified by said data length bits that has been transferred by said master communication device after said control bits indicative of locking, said link controller finally writes information related to unlocking in the lock status unit so that said slave communication device is unlocked from said master communication device.

4. A slave communication device according to claim 3, wherein said control bits include information indicative of unlocking and, when said receiving unit receives said control bits indicative of unlocking from said master communication device, said data link controller writes information related to unlocking in the lock status unit so that said slave communication device is unlocked from said master communication device.

5. A communication device for receiving, through a transmission path from a master communication device, communication packets composed of control bits including at least information relating to locking, a message and data length bits indicative of the length of the message, said communication device comprising:

a receiving unit for demodulating a signal on said transmission path to convert it into logic data, a data link controller for analyzing the logic data sent from said receiving unit, and a lock status unit for storing information relating to locking sent from said data link controller, wherein, if said control bits in said communication packets are a code relating to locking and the message having a length specified by said data length bits has been received successfully, said data link controller writes information relating to unlocking in said lock status unit so that said slave communication device is unlocked, and wherein, if said control bits in said communication packets are a code requesting unlocking, said data link controller writes information relating to unlocking in said lock status unit so that said slave communication device is unlocked from said master communication device.

* * * * *